(12) United States Patent
Schultz, Jr.

(10) Patent No.: US 6,234,224 B1
(45) Date of Patent: May 22, 2001

(54) AIRCRAFT FUELING NOZZLE

(76) Inventor: Robert L. Schultz, Jr., 520 3rd Ave., Avon by the Sea, NJ (US) 07717

( * ) Notice: Subject to any disclaimer, the term of this patent is extended or adjusted under 35 U.S.C. 154(b) by 0 days.

(21) Appl. No.: 09/525,191

(22) Filed: Mar. 14, 2000

(51) Int. Cl.[7] .................................................. B65B 1/04
(52) U.S. Cl. ........................ 141/384; 141/95; 141/301; 251/149.9
(58) Field of Search ................................ 141/384, 67, 95, 141/301, 302; 239/586, 569, 578, 74; 251/149.9, 143; 137/540, 614.03, 614.05, 614.06

(56) References Cited

U.S. PATENT DOCUMENTS

| | | | |
|---|---|---|---|
| 2,592,759 | * 4/1952 | Sullivan | 141/95 |
| 2,665,926 | 1/1954 | Fraser | 284/18 |
| 2,753,884 | 7/1956 | Lindsay | 137/322 |
| 3,168,125 | 2/1965 | Rosell | 141/346 |
| 3,441,055 | 4/1969 | Pickell | 137/614.06 |
| 4,328,844 | 5/1982 | Becktel et al. | 141/302 |
| 4,567,924 | 2/1986 | Brown | 141/207 |
| 4,638,842 | 1/1987 | Hawley et al. | 141/302 |
| 4,794,960 | 1/1989 | Hawley et al. | 141/384 |
| 5,405,120 | 4/1995 | Kerpan et al. | 251/149.9 |
| 5,540,413 | 7/1996 | Brown | 251/143 |
| 5,765,610 | 6/1998 | Brown | 141/383 |
| 5,904,302 | 5/1999 | Brown | 239/586 |
| 5,906,227 | * 5/1999 | Sowry | 141/65 |

* cited by examiner

*Primary Examiner*—Steven O. Douglas
(74) *Attorney, Agent, or Firm*—Christopher J. Whewell

(57) ABSTRACT

Provided herein are fueling nozzles for the re-fueling of various motorized vehicles, particularly aircraft. A re-fueling nozzle according to this invention includes a gauge from which the pressure of a liquid fuel passing through the nozzle may be read by a technician performing the re-fueling operation. Nozzles according to the invention further comprise a shrouding means which protect the pressure gauge from damage during a refueling operation, or while the nozzle is being transported or stored.

According to a preferred form of the invention, a nozzle comprises an inner conduit portion and an outer sleeve portion, wherein the outer sleeve portion is rotatable about the inner conduit portion. A shrouding means according to the invention is disposed on the outer sleeve portion, and moves when the outer sleeve portion is rotated, such as, when the nozzle is being engaged to a nozzle-receiving portion of an aircraft fuel tank, to expose the viewing face of the gauge to enable a re-fueling technician to know at all times the exact pressure of the fuel as it enters the fuel tank. Through use of a fuel nozzle according to the invention, tank integrity is preserved, and ruptures due to overpressurization of liquid fuels may be eliminated.

13 Claims, 8 Drawing Sheets

AIRCRAFT FUELING NOZZLE

This invention relates to nozzles useful in association with the fueling operations of aircraft. More particularly, the invention relates to nozzles useful for fueling and re-fueling aircraft from a flange that is located on the underside of a wing (underwing fueling).

BACKGROUND

Fueling nozzles for the underwing fueling of aircraft have been known since wings having a hollow interior space capable of containing fuel for the aircraft's engine were first utilized. To fill such a tank with fuel requires the transfer of liquid fuel (which often may comprise a kerosene distillate fraction) from a reservoir in which it is contained to the aircraft's fuel tank. Such transfer typically involves the use of a conduit that typically comprises a flexible hose, one end of which is connected to the outlet of a fuel pump and the other end of which is connected to a fueling nozzle portion. The nozzle portion is typically of an investment cast construction, and comprises one half of a quick-connecting/ disconnecting mating couple, the other half of which (the nozzle-receiving portion) is an integral part of the outlet portion an aircraft's fuel tank and is disposed at the opening of the fuel tank at which fuel is admitted during a re-fueling operation. Under such an arrangement, the nozzle may be quickly connected to the fuel tank, and fuel may be pumped from the reservoir through the conduit and nozzle, and into the tank. The mating couple which comprises the nozzle portion as one half is generally fitted with sufficient sealing provisions to preclude the leakage of fuel from the transfer system (reservoir, conduit, pump, nozzle, and nozzle-receiving portion of an aircraft fuel tank) to the surroundings during the re-fueling operation.

Although it is possible for a fuel tank that is contained within an aircraft wing to be filled with fuel from a sealable opening located at the top of the wing, bottom of the wing, or even on the side of the wing, practical field operations have shown that it is fastest, easiest, and thus most practical for ground crews to re-fill the inner wing fuel tanks of commercial aircraft using a sealable opening that is located on the bottom or underside of the wings of the aircraft. Towards this end, various nozzles and nozzle configurations have been developed over the years to simplify the re-fueling operation, to minimize time associated with the re-fueling operation, and to maximize the safety level of the overall operation from the standpoint of all persons involved, including passengers, the air crew, and the ground crew.

One requirement of the re-fueling operation is that the nozzle comprise a means by which it may be rapidly connected and disconnected from the nozzle-receiving portion of an aircraft tank. This requirement is accomplished by constructing the nozzle that is to be attached to the fuel tank from an inner conduit portion that is substantially circular in cross section, and an outer sleeve portion. The inner conduit portion is essentially a straight pipe having attached at one end the fuel delivery hose, and having at its other end a flange which mates with the nozzle-receiving portion of the aircraft's fuel tank. The outer sleeve portion is coextensively disposed about the inner conduit portion, and the outer sleeve portion terminates at approximately the point where the inner conduit portion terminates at the fuel delivery end of the conduit, and at this end the outer sleeve portion comprises a means for securing the fueling nozzle that comprises such conduit/sleeve assembly in rigid position when placed in the nozzle-receiving flange on the aircraft.

One desirable means for securing the fueling nozzle to the nozzle-receiving flange of an aircraft's fuel tank is a means which permits a refueling technician to place the end of the nozzle from which fuel is delivered into the nozzle-receiving flange on the aircraft, and twist or turn the outer sleeve portion of the nozzle assembly in a mono-directional single motion so that a sealed mating of the fuel tank opening and the fuel delivery end of the nozzle conduit is formed by virtue of such twist or turn, and the outer sleeve portion is thus effectively locked in place. Such fueling nozzle assemblies are known in the prior art, and include those described in U.S. Pat. Nos. 2,665,926; 2,753,884; 3,168,125; 3,441,055; 4,328,844; 4,567,924; 4,638,842; 4,794,960; 5,405,120; 5,540,413; 5,765,601; and 5,904,302, the entire contents of each of which are herein incorporated by reference. While one preferred means for locking the outer sleeve portion in secure position on the nozzle receiving flange is described in U.S. Pat. No. 5,765,601 any functionally equivalent means known to those skilled in the art for locking the outer sleeve portion in secure position with respect to the nozzle receiving flange portion of the aircraft's fuel tank while simultaneously providing a sealed fit between the aircraft's fuel tank inlet and the fuel delivery end portion of the inner conduit of the nozzle assembly is referred to herein as a means for securing the fuel nozzle to the aircraft.

In accordance with known refueling practice, the reservoir that contains fuel for aircraft is often conveniently located on a motorized vehicle, such as a truck. Conveniently, such truck also typically houses the refueling conduit, such as an approved grade of rubber hose, and a means for coiling the hose when it is not in use. Further, such truck or vehicle also contains a means for securing the fueling nozzle that is attached to the end of the hose. There is also a fuel pump that is fed from the reservoir, which serves to pressurize the fuel to propel it through the conduit hose and to deliver it to the fuel tank. The fuel pump contains a pressure-regulating means which may be adjusted by the re-fueling technician to a desires specific level of pressure. It is common practice in the art to set the pressure on a fairly infrequent basis, and then re-test the fuel pressure at intervals to assure its sufficiency. However, this common approach has the serious drawback that in the event that that fuel pressure is inadvertently increased, a refueling technician who refuels aircraft may not be aware of an increased level of fuel pressure at the regulator for quite some time, since conventional re-fueling nozzles are not equipped with pressure gauges on the nozzle itself. Therefore, a person refueling the aircraft has no way of knowing the exact fuel pressure in the nozzle during the refueling operation. This may have serious consequences in cases where the pressure of the fuel being delivered exceeds the maximum pressure rating of the in-wing fuel tanks aboard the aircraft, for it is entirely within the realm of possibility that the fuel tank integrity may be compromised to the point of actual tank rupture, cases of such which have been documented. In such event, the aircraft wing must be dismantled and the fuel tank repaired or replaced, and then the aircraft must then be re-inspected for airworthiness, the whole operation of which being very costly and time consuming. Therefore, if a means for monitoring the pressure of the fuel at the point of its entry into an aircraft's fuel tank during the re-fueling operation were readily available, such means for monitoring the pressure would be of great advantage to the owner's of aircraft fleets worldwide, for it would greatly reduce, if not totally eliminate, the possibility of overpressure damage to an aircraft's in-wing fuel tanks as a result of a re-fueling operation. Further, if such a means were devised which was capable of withstanding the physical abuse (impact damage from being dropped) routinely encountered by fueling nozzles, such means would be of long-term benefit. If such a means were provided at a cost which is relatively low, such would be readily welcomed by the aviation industry. The present invention provides a means which satisfies these criteria.

SUMMARY OF THE INVENTION

The present invention is a nozzle assembly for the re-fueling of aircraft which comprises an inner conduit portion that comprises a tubular conduit having an interior through which a liquid fuel may be caused to pass, and an outer sleeve portion disposed coextensively about the inner conduit portion. The outer sleeve portion has an outer surface and the outer sleeve portion is rotatable about the inner conduit portion. A nozzle according to the invention further comprises a pressure gauge that is in fluid contact with the interior of the inner conduit portion, and there is a gauge shrouding means connected to the outer sleeve portion.

The gauge shrouding means is constructed of a heavy gauge metal, and in one form of the invention is essentially an oval piece of sheet metal stock having s skirt disposed about its outside perimeter that extends towards the pressure gauge. The pressure gauge in one form of the invention is disposed between the gauge shrouding means and the outer surface of said outer sleeve portion.
The gauge shrouding means includes a hole in the sheet metal or void through which the viewing face of the pressure gauge may be seen, and it includes a solid portion through which the viewing face of said pressure gauge may not be seen. The shrouding means is connectively attached to the outer sleeve portion, and may be moved with respect to the viewing face of the pressure gauge by virtue of a refueling technician rotating the outer sleeve portion. That is, when one uses the nozzle according to the invention to re-fuel an aircraft, all that is required is that the nozzle is placed into the nozzle-receiving flange on the aircraft, and apply a locking twist of the outer portion of the nozzle assembly to effect a seal of the inner conduit to the fuel tank. The pressure gauge that is normally shrouded by the shrouding means during its storage and transportation, thus becomes visible to the re-fueling technician by virtue of the shrouding means having been physically moved with respect to the pressure gauge, thus causing the viewing face of the pressure gauge to become visible through the hole or void in the shrouding means. Once the fuel tank is filled, the outer sleeve portion is rotated to unlock the nozzle from the aircraft, which act simultaneously causes the portion of the gauge shrouding means through which the viewing face of said pressure gauge may not be seen to cover the viewing face of the pressure gauge, thus effectively shielding the gauge from damage during storage, transportation, and even droppage of the fueling nozzle assembly.

DETAILED DESCRIPTION

Figure 1A:
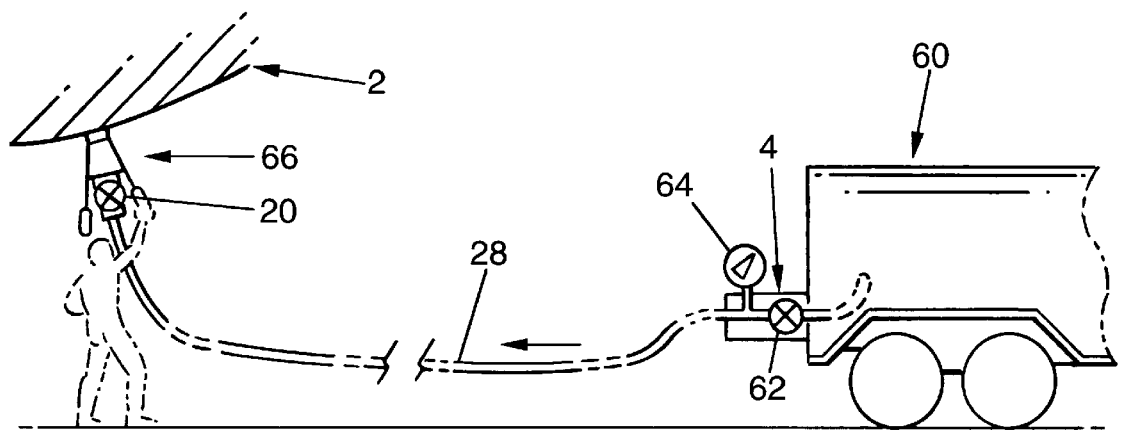
FIG. 1A is a schematic view of a refueling operation being conducted on an aircraft in accordance with the prior art.

Referring to the drawings and initially to FIG. 1A there is illustrated a typical equipment setup employed during an under-wing re-fueling operation of an aircraft according to prior art practice. During such operation, liquid fuel is transferred from reservoir 60 through conduit 28 to nozzle assembly 66 and into the fuel tank contained in aircraft wing 2. Valve means 62 and 20 are used to conveniently stop or permit flow of liquid fuel through the re-fueling line. There is a regulator 64 disposed at or near the fuel pump 4 for adjusting the fuel pressure in the delivery line. However, as is common, the conduit 28 is typically of such length that the re-fueling technician is sufficiently removed from the gauge on the pressure regulator 64 that the amount of pressure in the line is not discernable by the technician, and he thus is forced to rely on recent historical "good" refueling operations to base a future conclusion that the re-fueling operation he is undertaking is safe.

Figure 1B:
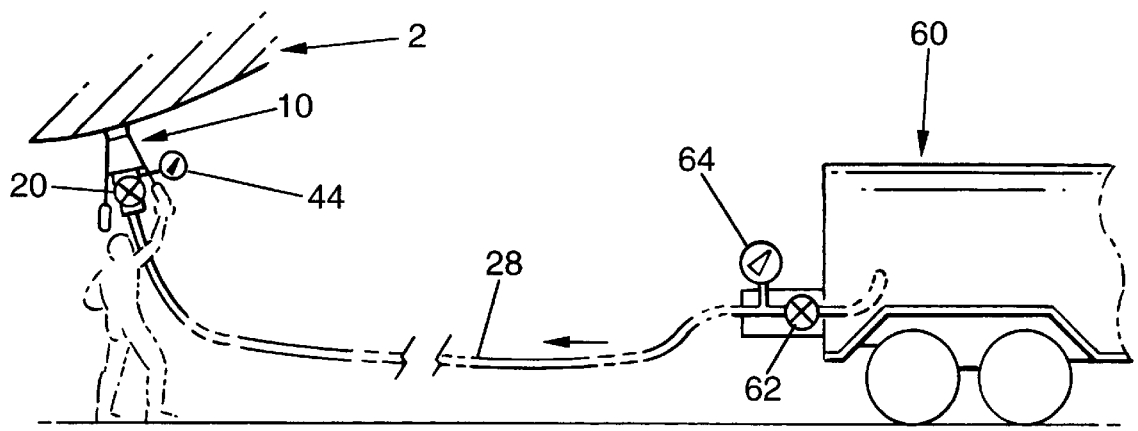
FIG. 1B is a schematic view of a refueling operation being conducted on an aircraft in accordance with the present invention.

In FIG. 1B there is illustrated an equipment setup employed during an under-wing re-fueling operation of an aircraft using a fueling nozzle according to the present invention 10. During such operation, liquid fuel is transferred from reservoir 60 through conduit 28 to nozzle assembly 66 and into the fuel tank contained in aircraft wing 2. Valve means 62 and 20 are used to conveniently stop or permit flow of liquid fuel through the re-fueling line. There is a regulator 64 disposed at or near the fuel pump 4 for adjusting the fuel pressure in the delivery line. However, the fueling nozzle 10 also comprises a pressure gauge 44 in accordance with the invention that may be read by the re-fueling technician during the entire re-fueling process.

Figure 2:
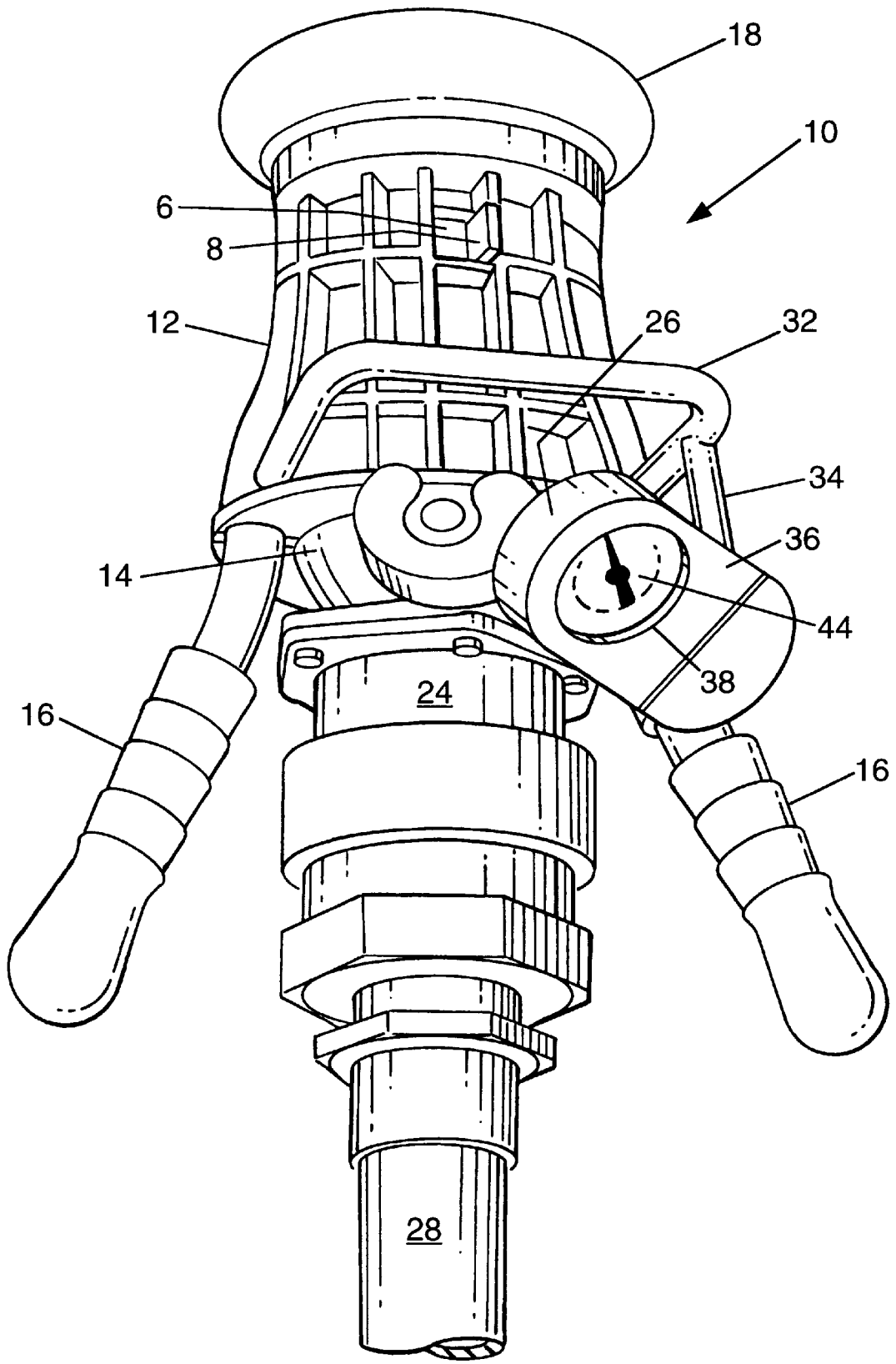
FIG. 2 is a perspective view of the gauge side of a nozzle assembly in accordance with the invention.

In FIG. 2 is shown a perspective view of the gauge side of a nozzle assembly in accordance with the invention. In this view, the outer sleeve portion and inner conduit portions are situated so that the viewing face of the pressure gauge is visible. This is the same position as when the nozzle is secured to a nozzle-receiving portion of an aircraft fuel tank, showing the viewing face of the gauge visible through that portion of the shrouding. In this figure, the outer sleeve portion 12 is shown. The outer sleeve portion has handle means 16 which are conveniently used by a re-fueling technician when securely affixing the nozzle assembly 10 to the nozzle-receiving portion of the fuel tank of an aircraft. Typically, the technician will hold the handles 16 while positioning the mating end 18 of the nozzle assembly from which fuel is delivered into the tank into the nozzle-receiving portion of the aircraft's fuel tank. Then, the technician simply applies a twisting torque to handles 16 simultaneously to lock the nozzle in position. FIG. 2 also shows the location of the inner conduit 14, housed within the outer sleeve portion.

In one preferred form of the invention, there is a rectangular hole 6 disposed through the wall of the outer sleeve portion 12. The inner conduit portion has as an integral part of its assembly a tang 8 which protrudes through the hole 6. The tang and slot combination serve to limit the rotational capability of the outer sleeve portion with respect to the inner conduit portion, as the motion of the outer sleeve with respect to the inner conduit is limited by the tang's contacting the terminus of the slot. Such provision assures that the outer sleeve portion does not rotate excessively about the inner conduit portion. Further, in one preferred form of the invention, the amount of rotation of the outer sleeve portion with respect to the inner conduit that is permitted by the tang and slot combination is the same amount required to cause the viewing face of the pressure gauge on a nozzle assembly according to the invention to move from the visible position to the shrouded position.

Also shown in FIG. 2 is the shrouding means 36 and a preferred method for its attachment to the outer sleeve portion 12. Here, support bar 32 which in one form of the invention is u-shaped, is connected to the outer sleeve portion at two points which are approximately 180 degrees, coincident with the location at which the handles 16 are connected to the outer sleeve portion. The support bar 32 is useful as a location at which a technician may fasten the nozzle assembly to an anchoring means located on a vehicle that houses the fuel reservoir, by, for example, a hook means. The support bar is preferably constructed of a heavy gauge steel. There is also shown in FIG. 2 the shrouding means 34. The shrouding means is in one form of the invention an oval-shaped piece of sheet stock having a hole or void 38 disposed through its surface, the function of which hole or void being to permit the viewing of the viewing face of the pressure gauge that is also part of a nozzle assembly according to the invention, when the outer sleeve portion is sufficiently disposed with respect to the inner conduit to which the pressure gauge is mounted. In one preferred form of the invention, there is a skirt portion 26 that extends coextensively about the perimeter of the shrouding means. The skirt portion effectively guards the pressure gauge 44 from physical damage that could potentially be inflicted from percussions originating from an axial position with respect to the nozzle assembly as a whole. It is an advantage of this invention that the gauge is also in a protected position even when its viewing face is in a visible location, by virtue of the skirt portion 26. Such a feature is provides added protection to the gauge even during re-fueling.

The shrouding means includes a means for its attachment to the outer sleeve portion. In one preferred form of the invention, the shrouding means 36 is held in rigid position by means of support bar 32, that is rigidly attached to the shrouding means support 34 at its other end. Further, as is shown more clearly in FIG. 3, the shrouding means is also connected at one of its ends to one of the handles 16. Such an attachment, coupled with the support bar 32 provides a reinforcing structure capable of holding the shrouding means in stationary position regardless of most any physical abuse it is likely to receive. While this means of attachment of the shrouding means to the outer sleeve portion has been described as a preferred means for doing so, other functionally equivalent means for connecting a shrouding means to the outer sleeve portion are embraced by the present invention. For example, one may choose to provide two support bars that are attached to each of the handle means as a method for maintaining the shrouding means in a stationary position. Further, the shrouding means may comprise a sheet metal wrap which coextensively extends about the entire outer sleeve, wherein said sheet metal wrap includes a hole through which the gauge may be viewed, said sheet metal wrap being attached by any convenient means to the outer sleeve portion. Further, the shrouding means may be attached to the support bar 32 or the functional equivalent with respect to the support bar in such utility. Thus, there are embraced within the scope of this invention a wide variety of means for attaching a shrouding means to the outer sleeve portion, and the shrouding means may take on any of various possible configurations.

Therefore, for purposes of this invention and the appended claims, the words "shrouding means" means any piece of sheet metal stock, block of metal, or other material that is capable of being attached to the outer sleeve portion of a fuel nozzle used in the refueling of aircraft, wherein the sheet metal stock, block of metal, or other material comprises a hole or void through which the viewing face of a gauge may be seen when a gauge is in the line of sight of said hole or void. Other materials may include various petroleum-resistant polymers, including nitrile rubbers, polyolefins, ABS, Kevlar®, and any other known material having sufficient impact strength to serve to shroud a gauge that is in fluid contact with the inner sleeve portion of such a nozzle, wherein the gauge is disposed between the shrouding means and the inner sleeve portion.

Also shown in FIG. 2 is the conduit 28, which is connected to the inlet portion of the nozzle assembly by conventional fluid coupling means 24. The viewing face of the gauge 44 is also visible through the hole 38.

Figure 3:
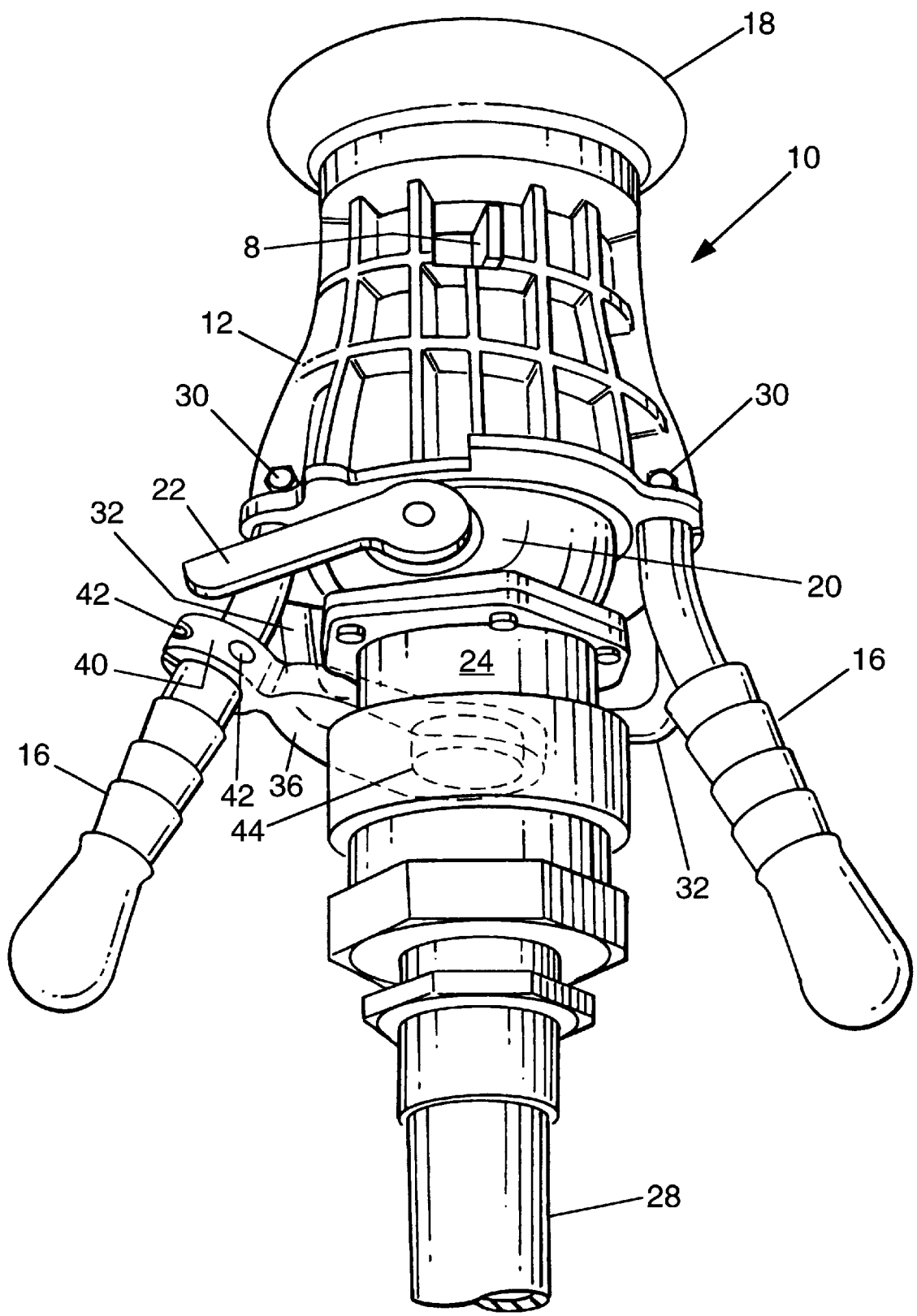
FIG. 3 is a perspective view of the valve side of a nozzle assembly in accordance with the invention.

FIG. 3 shows a view of the same nozzle assembly 10 in accordance with the present invention as was shown in FIG. 2; however, the nozzle assembly has been rotated 180 degrees. In this figure, the outer sleeve portion 12 is shown, having handles 16 which are secured to the outer sleeve portion by means of bolts 30, for in this one preferred form of the invention, the handles 16 have threaded ends (not shown). Also shown is a handle 22 which is used to commence or cease the flow of liquid fuel through the nozzle by virtue of its being in mechanical with a conventional fluid control valve 20, the use, configuration, and design of which are all well understood by those skilled in this art.

FIG. 3 shows in greater detail one preferred means by which the shrouding means 36 may be effectively attached to the outer sleeve portion, namely through the use of a connective means that is an integral part of the shrouding means. Here, half shell portion 40 is removable from the assembly by virtue of the removal of fastening means 42 which are machine screws that are securable in place by their being engaged in matching tapped holes that are drilled in the mating opposite side of the shrouding means which when taken together with half shell portion 40 functions as an effective clamping means. Thus, half shell 40 when in place with machine screws tightly threaded, effectively clamps the shrouding means to the handle 16 to which it is attached. Of course, as mentioned earlier, other means for effectively attaching a shrouding means to the outer sleeve portion of a nozzle assembly are functionally equivalent. The half shell portion 40 could thus easily have been welded in position. Additionally, FIG. 3 gives an indication of the perspective of the location of the gauge 44 and the shrouding means 36 with respect to the handle 20 used for controlling the flow of liquid fuel through the nozzle. Also shown in this figure is the conduit portion 28.

Figure 4:
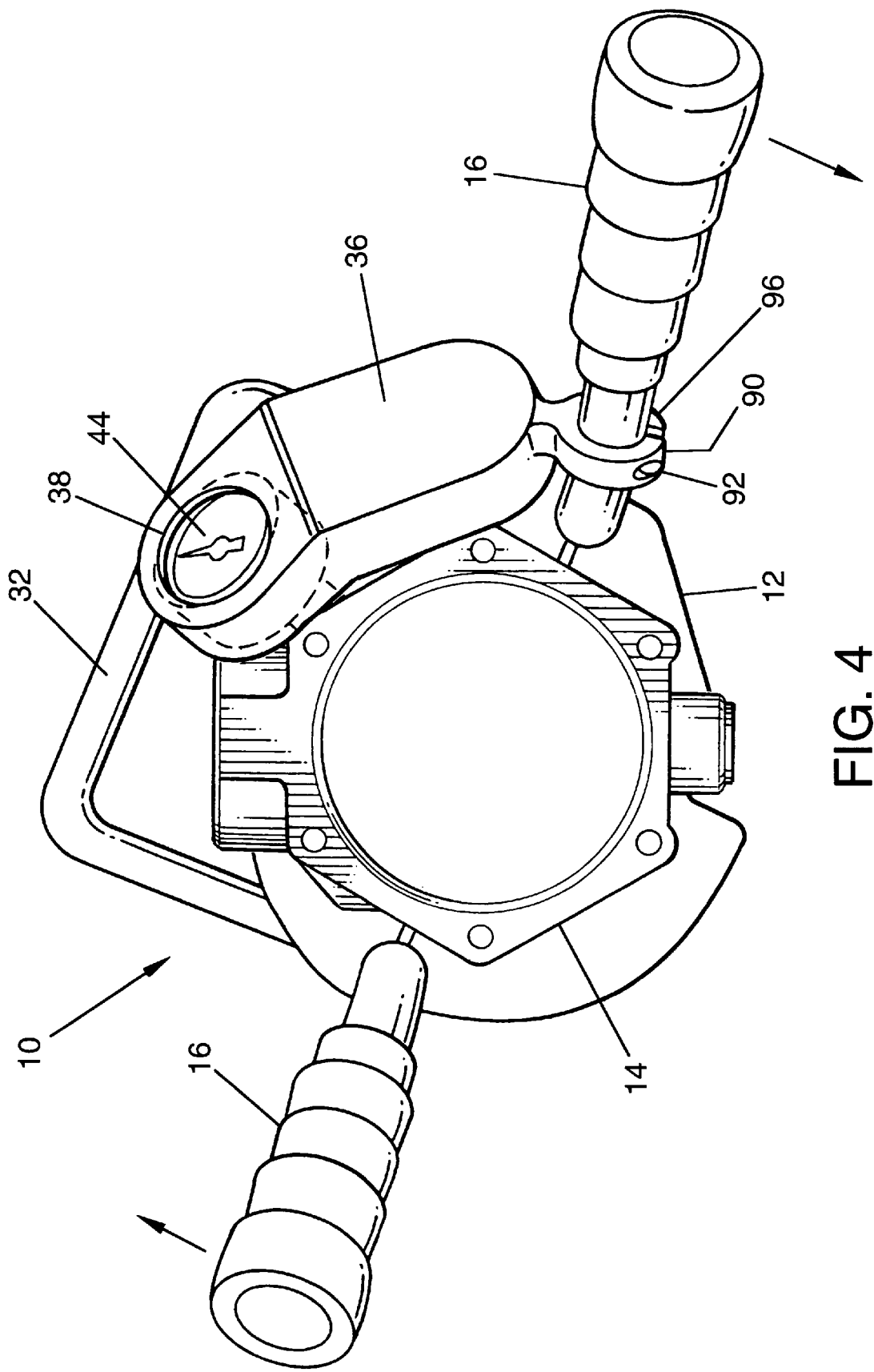
FIG. 4 is a perspective view of a nozzle assembly according to the invention to which no hose is connected as viewed from the inlet portion of the nozzle to which a fuel hose is typically connected, with the gauge face in the viewable position.

In FIG. 4 is illustrated a nozzle assembly 10 in accordance with the invention, which nozzle assembly has had the fuel conduit 28 and its attaching means 24 removed from the nozzle. Thus, the inner conduit portion 14 is readily visible, and it is through the inner conduit portion through which fuel flows during a refueling operation. The pressure gauge 44 is connected to the inner conduit so that the sensing element within the pressure gauge (which suitable elements are well-known to those of ordinary skill in this art) are in fluid contact with the inner space located within the conduit and thus capable of sensing the pressure therein. One convenient method for providing the pressure gauge to be in fluid contact with the space within the inner conduit is to provide a hole in the sidewall portion of the inner conduit, which the inner conduit possesses by virtue of its physical configuration being that of tubular construction. Conveniently, such a hole in the sidewall portion is threaded to accept a mating threaded tubular portion on the pressure gauge itself, or which is part of an extension of the pressure gauge, the use of which extensions is well-known to those in the art of plumbing. Thus, the pressure gauge may be simply screwed into a threaded hole in the sidewall of the inner conduit portion of a nozzle assembly according to the invention. Such provision allows one to select from any one of a myriad of possible locations for the pressure gauge in accordance with the invention, since through the use of various extensions, bends, elbows, etc. in the conduit that is used to communicate a pressure signal from the inner space within the inner conduit portion of a nozzle assembly in accordance herewith, the gauge used to indicate the fuel pressure may be located essentially anywhere. The main criteria for providing a re-fueling nozzle according to the invention is that the gauge is disposed between the shrouding means and the inner conduit portion of a nozzle assembly according to the invention, as viewed from a person standing beside the re-fueling nozzle during a refueling procedure.

FIG. 4 also shows the direction to which a twisting torque may be simultaneously applied the handles 16 while the inner conduit portion remains stationary with respect thereto, during the docking of the fuel nozzle to the nozzle-receiving means on the aircraft's fuel tank. The location of a support bar 32 is shown, as well as a shrouding means 36 and a hole 38 disposed through its surface, through which a reading on the pressure gauge may be observed. The outer sleeve portion 12 is also shown, as well as an alternative means for affixing the shrouding means in a clamped position to one of the handles 16 which is in principle similar to that already described using a half shell 40, except in this embodiment the clamping means is effected by tightening of a single screw disposed through two clamping portions 90 and 96 and a hole through the handle through which the assembly is attached. Such a shroud so equipped may be conveniently located in such position by sliding the clamping portion over the handle until the screw holes in the clamping means is aligned with the hole disposed through the handle, then inserting and tightening the screw. However, as mentioned, this is but one preferred embodiment for attaching a gauge shroud to the outer sleeve portion according to the invention and should not be construed as being delimitive of the scope of this invention in any measure. Thus, the view of the nozzle assembly depicted in FIG. 4 illustrates the position of the gauge when a nozzle assembly according to the invention is securely attached to a nozzle-receiving portion of an aircraft's fuel tank during a re-fueling operation.

Figure 5:
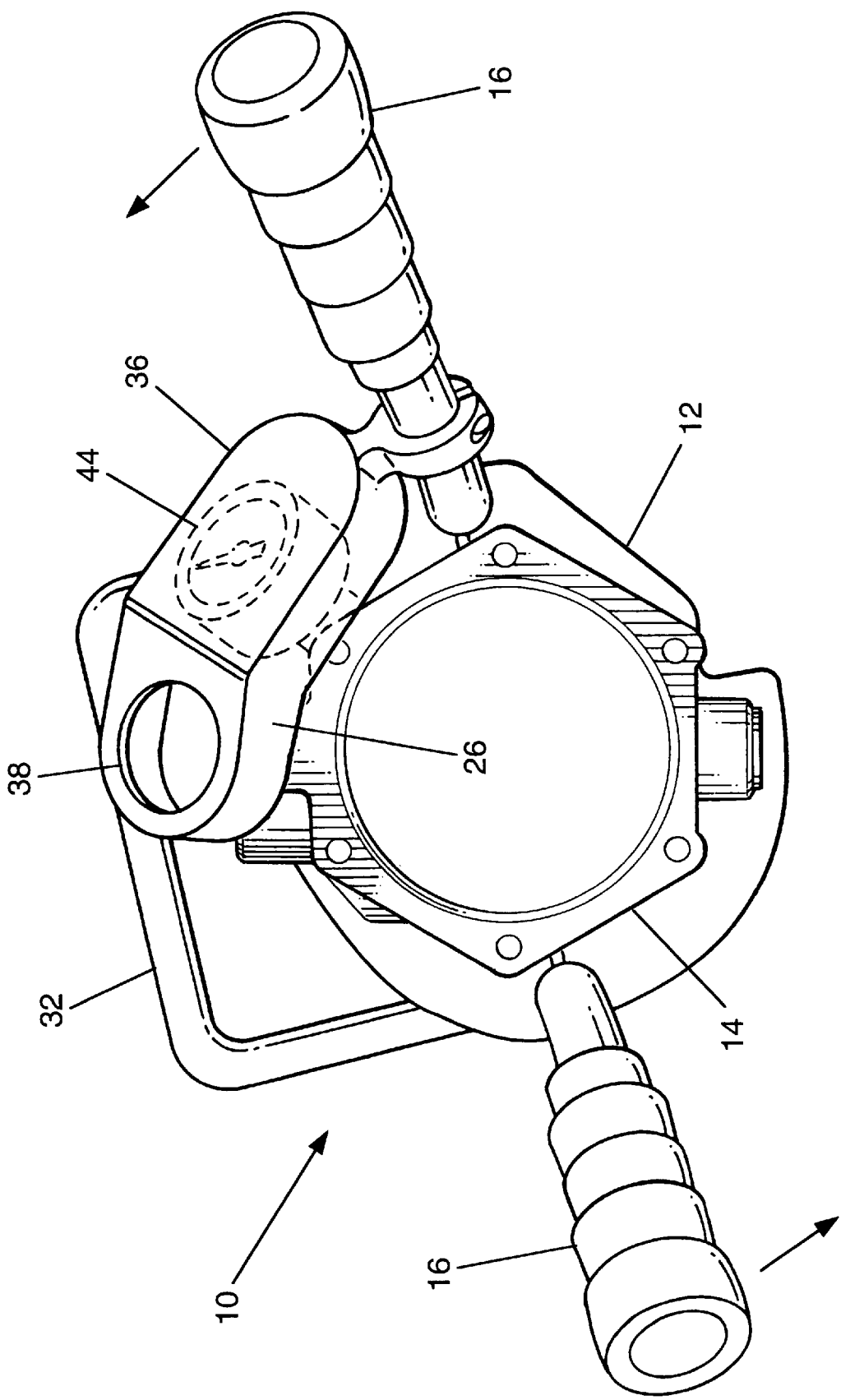
FIG. 5 is a perspective view of a nozzle assembly according to the invention to which no hose is connected as viewed from the inlet portion of the nozzle to which a fuel hose is typically connected with the gauge face in the shrouded position.

FIG. 5 shows a nozzle assembly 10 as was depicted in FIG. 5, however the outer sleeve portion 12 has been rotated in the direction of the arrows with respect to the inner conduit portion 14 by virtue of the application of a twisting torque having been applied to the handles 16, the same twisting torque employed when disengaging a nozzle assembly according to the invention from a nozzle-receiving portion on the fuel tank of an aircraft. In such disengagement, the position of the hole 38 in the shrouding means 36 is caused to be moved such that the gauge 44 is no longer visible and is shrouded from damage from routine movements. Thus, the view of the nozzle assembly depicted in FIG. 5 illustrates the position of the gauge when the nozzle assembly is being stored or transported.

Figure 6:
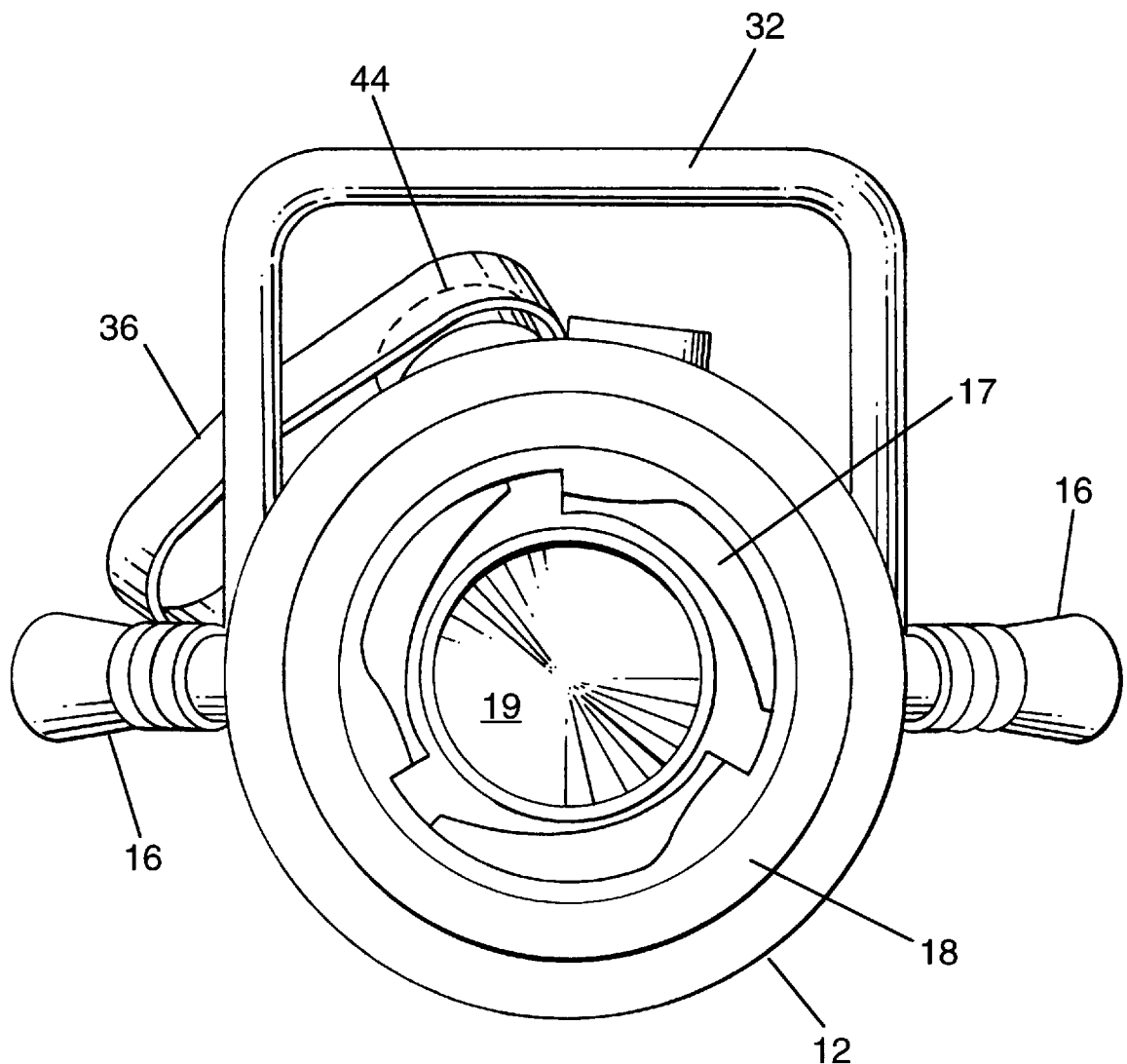
FIG. 6 is an end perspective end view of the point at which fuel exits the nozzle and is delivered into the fuel tank of an aircraft, showing a twist connector that attaches to the nozzle-receiving portion of the aircraft's fuel tank.

FIG. 6 is an end view taken from the mating end 18 of a fueling nozzle in accordance with the invention, showing the respective locations of the outer sleeve portion 12, handles 16, pressure gauge 44, shrouding means 36 and support bar 32. One half 17 of a mating pair comprising a twist-lock connector is also depicted as exemplary only and not delimitive hereof in any measure.

Figure 7:
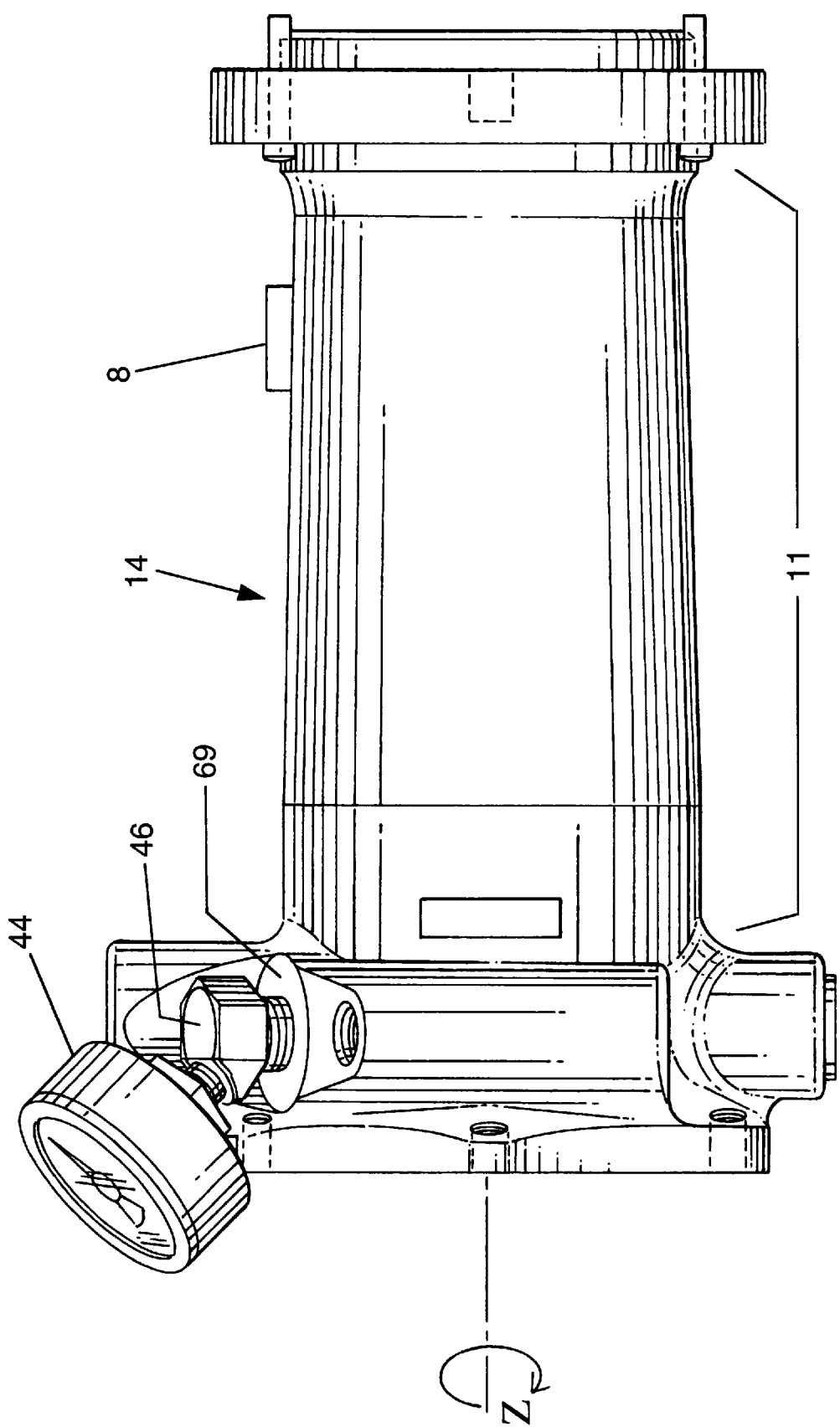
FIG. 7 is a side perspective view of the inner conduit portion of a nozzle assembly according to the invention, showing the gauge and its adapter.

In FIG. 7 is shown an inner conduit portion 14 according to the invention, showing a preferred means by which a pressure gauge 44 may be made to be in fluid contact with the inner space within such inner conduit. In such embodiment, the threaded portion of a pressure gauge is screwed into a threaded female hole of an adapter 46, which female threaded hole is angled with respect to the axis of insertion of the adapter into the sidewall portion of the inner conduit at boss 69, to provide any angle desired of the gauge with respect to the axis Z of the inner conduit. Thus, as mentioned, the gauge may be located in any one of several possible positions, with the sole proviso being that it must be mounted so as to not interfere with rotation of the outer sleeve portion with respect to the inner conduit portion. In this figure is also shown the central portion 11 of the inner conduit, and it is over this central portion that the outer sleeve portion is preferably disposed in a rotatable fashion. Also shown in this figure is tang portion 8.

Figure 8:
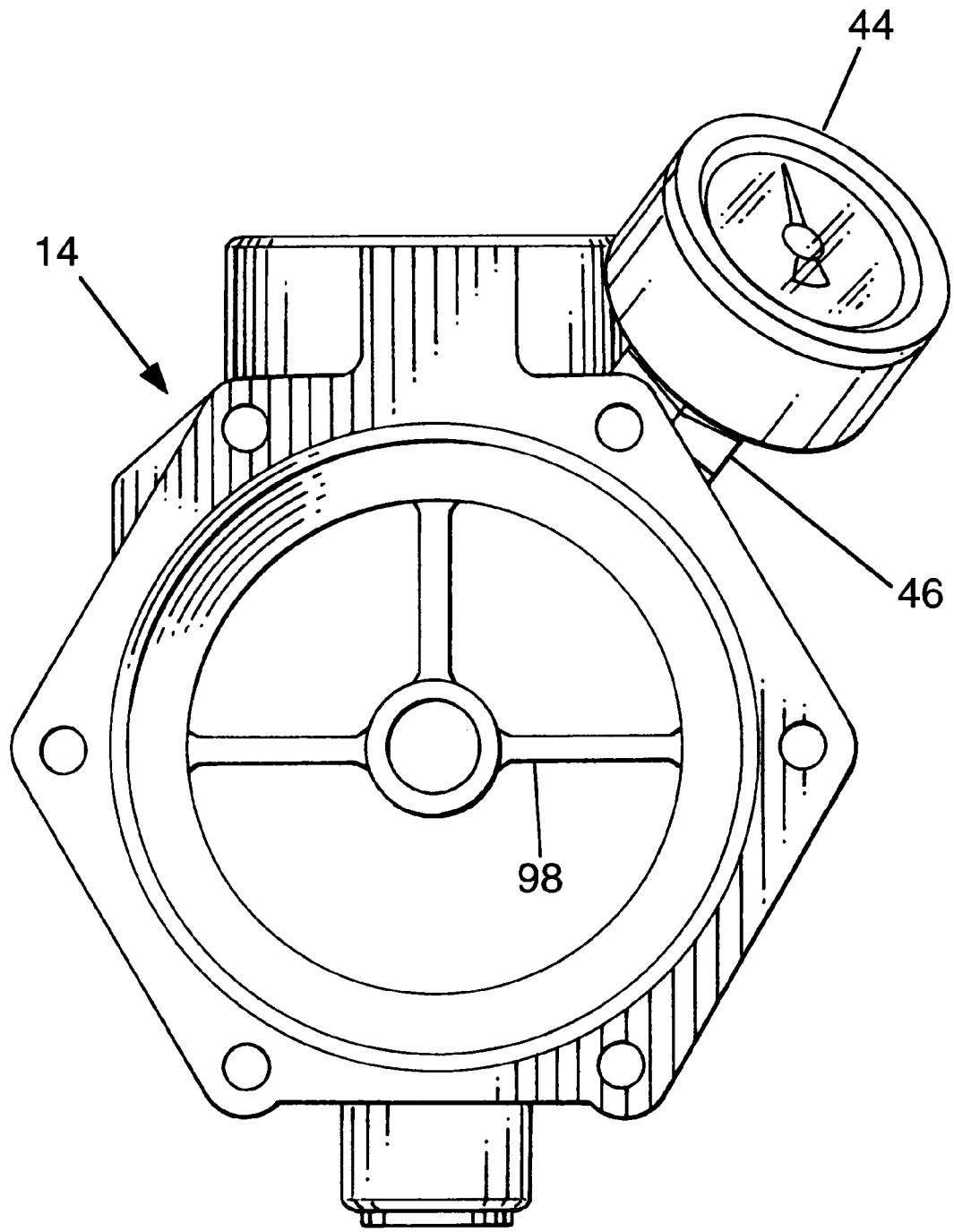
FIG. 8 is an end view of the inner conduit shown in FIG. 7.

In FIG. 8 is shown an end view of the inner sleeve portion 14 from FIG. 7, showing the location of the gauge 14, adapter 46, and inner baffle or flow director 98 often used by nozzle manufacturers to smooth out flow of fuel through the nozzle, or from which a pressure signal may be taken, the use of which is well known to those skilled in this art.

As mentioned throughout this specification, there is disposed at the mating end 18 portion of a nozzle assembly a means for connecting a nozzle assembly in accordance with the invention to the nozzle receiving portion of a fuel tank on an aircraft. Typically, the means for connecting the nozzle assembly consists of a mating pair which comprises two mating parts, the first part of which is located on the fueling nozzle and the second part of which is located on the fuel tank of the aircraft, near the opening of the fuel tank at which fuel is admitted during a re-fueling procedure. This second part may correctly be referred to as a nozzle-receiving means, since it is capable of receiving a fueling nozzle in accordance with the invention, while simultaneously providing a seal of high integrity between the inner conduit portion of the nozzle portion and the fuel tank. Such mating parts or mating pair are well known in the art, and the present specification embraces the use of a gauge/shrouding means combination in accordance with the invention with all known mating pairs used on aircraft fuel tanks and refueling nozzles useful in conjunction therewith. One example of a suitable mating pair is that described in U.S. Pat. No. 5,904,302 which comprises an interlock ring on the aircraft that is adapted to be mated to an annular locking lug retainer that is an integral part of the nozzle assembly. Another example of a suitable mating pair is that described in U.S. Pat. No. 5,756,610 which comprises an adapter having indexing pins that interlock with a corresponding mating portion. These examples of mating pairs are exemplary only, and shall not be construed as being delimitive of the scope of the invention herein in any measure. The shrouding means/pressure gauge couple of the invention is universally applicable to all nozzles used in refueling aircraft.

As used in this specification, various wares or elements of the invention are connected to other wares or elements of the invention, such as the support bar 32 being connected to the outer sleeve portion 12. In the case of all such connections or attachments of stationary elements of the invention, any conventional fastening means may be employed, including without limitation, welds, nuts and bolts, rivets, fusion of metals, adhesives, or even one-piece construction by virtue of a casting or forging operation. The present invention is intended to embrace all means of connecting such elements and wares.

I claim:

1. A nozzle assembly for the re-fueling of aircraft which comprises:
   a) an inner conduit portion that comprises a tubular conduit having an interior through which a liquid fuel may be caused to pass;
   b) an outer sleeve portion disposed coextensively about said inner conduit portion, said outer sleeve portion having an outer surface and wherein said outer sleeve portion is rotatable about said inner conduit portion;
   c) a pressure gauge in fluid contact with the interior of said inner conduit portion, wherein said pressure gauge has a viewing face;
   d) a gauge shrouding means connected to said outer sleeve portion.

2. A nozzle assembly according to claim 1 wherein said pressure gauge is disposed between said gauge shrouding means and the outer surface of said outer sleeve portion.

3. A nozzle assembly according to claim 1 wherein said gauge shrouding means includes a void through which the viewing face of said pressure gauge may be seen.

4. A nozzle assembly according to claim 1 wherein said gauge shrouding means includes a solid portion through which the viewing face of said pressure gauge may not be seen.

5. A nozzle assembly according to claims 3 and 4 wherein said shrouding means that is connected to the outer sleeve portion may be moved with respect to the viewing face of said pressure gauge by virtue of rotating said outer sleeve portion.

6. A nozzle assembly according to claim 5 wherein the viewing face of said pressure gauge becomes non-viewable by virtue of rotation of said outer sleeve portion.

7. A nozzle assembly according to claim 1 further comprising a valve means disposed within said inner conduit portion, wherein said valve means is capable of selectively opening or closing said inner conduit to permit or deny passage of a liquid fuel through said inner conduit portion.

8. A process for fueling an aircraft comprising the steps of:
   a) providing a nozzle assembly according to claim 7 in which the inner conduit portion is in fluid contact with a pressurized source of liquid fuel and wherein the viewing face of said pressure gauge is not visible;
   b) causing said nozzle assembly to be securely connected to the nozzle-receiving portion of the fuel tank of an aircraft by rotation of said outer sleeve portion, wherein such rotation causes the viewing face of said pressure gauge to become visible; and
   c) commencing fuel flow through said inner conduit portion of said nozzle assembly so as to cause fuel to enter said fuel tank.

9. A process according to claim 8 further comprising the step of:
   d) observing the pressure reading on said pressure gauge.

10. A process according to claim 9 further comprising the step of:
    e) disconnecting said nozzle assembly from said fuel tank by rotation of said outer sleeve portion about said inner conduit portion so as to cause the viewing face of said pressure gauge to become no longer visible.

11. A process for fueling an aircraft comprising the steps of:
    a) providing a nozzle assembly according to claim 1 in which the inner conduit portion is in fluid contact with a pressurized source of liquid fuel and wherein the viewing face of said pressure gauge is not visible;
    b) causing said nozzle assembly to be securely connected to the nozzle-receiving portion of the fuel tank of an aircraft by rotation of said outer sleeve portion, wherein such rotation causes the viewing face of said pressure gauge to become visible; and
    c) commencing fuel flow through said inner conduit portion of said nozzle assembly so as to cause fuel to enter said fuel tank.

12. A process according to claim 11 further comprising the step of:
    d) observing the pressure reading on said pressure gauge.

13. A process according to claim 12 further comprising the step of:
    e) disconnecting said nozzle assembly from said fuel tank by rotation of said outer sleeve portion about said inner conduit portion so as to cause the viewing face of said pressure gauge to become no longer visible.

* * * * *